(12) United States Patent
Mengel et al.

(10) Patent No.: US 10,246,330 B2
(45) Date of Patent: Apr. 2, 2019

(54) SYSTEMS AND PROCESSES FOR REMOVING HYDROGEN SULFIDE FROM GAS STREAMS

(71) Applicant: MARSULEX ENVIRONMENTAL TECHNOLOGIES CORPORATION, Lebanon, PA (US)

(72) Inventors: Michael Lyn Mengel, Fredericksburg, PA (US); Amy Patrice Evans, Harrisburg, PA (US); Eli Gal, Sunnyvale, CA (US); Paul Murray Leicht, Myerstown, PA (US)

(73) Assignee: Marsulex Environmental Technologies Corporation, Lebanon, PA (US)

( * ) Notice: Subject to any disclaimer, the term of this patent is extended or adjusted under 35 U.S.C. 154(b) by 0 days.

(21) Appl. No.: 15/486,553

(22) Filed: Apr. 13, 2017

(65) Prior Publication Data
US 2018/0297845 A1    Oct. 18, 2018

(51) Int. Cl.
| | | |
|---|---|---|
| *C01B 17/05* | (2006.01) | |
| *C01B 17/04* | (2006.01) | |
| *C01B 17/16* | (2006.01) | |
| *C01B 17/64* | (2006.01) | |
| *B01D 53/14* | (2006.01) | |
| *B01D 53/52* | (2006.01) | |
| *B01D 53/73* | (2006.01) | |
| *B01D 53/78* | (2006.01) | |
| *B01D 53/96* | (2006.01) | |
| *C05C 3/00* | (2006.01) | |
| *C05G 3/00* | (2006.01) | |

(52) U.S. Cl.
CPC .......... *C01B 17/64* (2013.01); *B01D 53/1418* (2013.01); *B01D 53/1468* (2013.01); *B01D 53/1493* (2013.01); *C05C 3/00* (2013.01); *C05G 3/0076* (2013.01); *B01D 2252/102* (2013.01); *B01D 2252/103* (2013.01)

(58) Field of Classification Search
None
See application file for complete search history.

(56) References Cited

U.S. PATENT DOCUMENTS

| | | |
|---|---|---|
| 4,518,572 A | 5/1985 | Ritter |
| 4,541,998 A | 9/1985 | Weber |
| 4,579,727 A | 1/1986 | Cronkright et al. |
| 4,569,832 A | 2/1986 | Laufhutte |
| 4,765,873 A | 8/1988 | Chang et al. |
| 5,207,927 A | 5/1993 | Marinangeli et al. |

(Continued)

FOREIGN PATENT DOCUMENTS

| | | |
|---|---|---|
| CA | 2188063 | 4/1998 |
| WO | 98-09714 | 3/1998 |

*Primary Examiner* — Daniel Berns
(74) *Attorney, Agent, or Firm* — Hartman Global IP Law; Gary M. Hartman; Domenica N. S. Hartman

(57) ABSTRACT

A process and system for hydrogen sulfide capture from gas streams employing an absorber vessel in which the gas stream containing hydrogen sulfide is contacted with an absorbent solution to remove the hydrogen sulfide from the gas stream. The process and system may further employ an oxidation vessel in which sulfides and/or bisulfides in the absorbent solution are oxidized to produce a thiosulfate and/or sulfate, yielding a solution that can be used as fertilizer or other applications.

19 Claims, 2 Drawing Sheets

(56) References Cited

U.S. PATENT DOCUMENTS

| | | |
|---|---|---|
| 5,470,486 A | 11/1995 | Gillespie |
| 2002/0131927 A1 | 9/2002 | Anderson et al. |
| 2003/0072707 A1* | 4/2003 | Ray .................... B01D 53/1468 423/514 |
| 2008/0050302 A1 | 2/2008 | Anderson et al. |
| 2013/0035528 A1 | 2/2013 | Marker et al. |

\* cited by examiner

SYSTEMS AND PROCESSES FOR REMOVING HYDROGEN SULFIDE FROM GAS STREAMS

BACKGROUND OF THE INVENTION

The present invention generally relates to systems and processes for removing acidic gases from gas streams, including but not limited to natural gas, refinery process gas, syngas from gasification, sour water strippers, anaerobic digestion of biomass, and other gases that may contain hydrogen sulfide ($H_2S$). The invention particularly relates to systems and processes for removing hydrogen sulfide from gas streams and oxidizing captured hydrogen sulfide to form thiosulfate, sulfate, or mixture of thiosulfate and sulfate.

Many gas streams, as nonlimiting examples, natural and associated gas, gas streams from biomass processing, coal and oil gasification processes, refinery streams, sour water stripper streams, and many more, contain sulfur in the form of hydrogen sulfide ($H_2S$). Hydrogen sulfide is corrosive, flammable, and explosive, and a hazardous and toxic air pollutant that produces an undesirable odor. Gases containing hydrogen sulfide are known to be hazardous to the environment, toxic, and odorous even at low concentrations of hydrogen sulfide. As a result, the emission of hydrogen sulfide into the atmosphere is closely regulated by clean air statutes, and removal of hydrogen sulfide from gas streams is of importance, particularly if the gas stream or constituents thereof are to be further processed or sold.

Gas liquid scrubbers (also referred to as contactors, absorbers, etc.) are widely employed to remove hydrogen sulfide from gases produced by industrial plants or present in natural gas. Scrubbers generally employ a liquid-containing media, such as amines, glycols, and methanol, which is brought into intimate contact with the gas to remove hydrogen sulfide by absorption. The resulting $H_2S$-rich absorbent is regenerated to produce a concentrated hydrogen sulfide stream that can be either converted to elemental sulfur in a Claus plant (unit) or re-injected into deep wells. Both are complex and very expensive processes.

Numerous physical and chemical processes exist for the capture of hydrogen sulfide from gases. These processes include amine-based chemical processes and physical processes, a notable example of which uses a glycol-based solvent commercially available under SELEXOL®. In these processes, hydrogen sulfide is absorbed into the solvent and then stripped in a concentrated form to become a concentrated hydrogen sulfide gas stream. Most of the streams containing hydrogen sulfide also contain carbon dioxide ($CO_2$), which is captured and stripped together with hydrogen sulfide so that the concentrated stripped gas contains both hydrogen sulfide and carbon dioxide. The presence of carbon dioxide with hydrogen sulfide makes the downstream treatment of an $H_2S$-containing gas stream more complex and expensive.

The concentrated hydrogen sulfide gas stream may be sent to a Claus unit to convert the hydrogen sulfide to elemental sulfur. The Clause process generally oxidizes and converts about one-third of the hydrogen sulfide content of the concentrated gas stream to sulfur dioxide, which then reacts with remaining hydrogen sulfide to produce elemental sulfur (the Claus reaction).

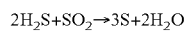

$$2H_2S + SO_2 \rightarrow 3S + 2H_2O$$

Water vapor, carbon dioxide, residual hydrogen sulfide, and other gas species are emitted from a Claus unit as a tail gas. The tail gas is not allowed to be emitted to the atmosphere, and instead must be treated in a tail gas treatment process to capture the residual sulfur compounds.

An alternative to the Claus process is to oxidize hydrogen sulfide from the concentrated stream to sulfur dioxide by combustion. The sulfur dioxide is then further oxidized to sulfur trioxide ($SO_3$) by a catalytic reaction to produce, by reaction with water, sulfuric acid ($H_2SO_4$) as a final product.

Existing processes for hydrogen sulfide capture and treatment have various shortcomings, for example, complex and expensive facilities that require a large foot print, high operating temperatures, energy intensive, and the production of low or negative value products. Consequently, there is an ongoing need for simpler and lower cost processes to capture hydrogen sulfide and convert captured hydrogen sulfide to a valuable product.

BRIEF DESCRIPTION OF THE INVENTION

The present invention provides systems and processes capable of capturing hydrogen sulfide from gas streams and then oxidizing the captured hydrogen sulfide to produce thiosulfate, sulfate, or a mixture thereof.

According to one aspect of the invention, such a process may include contacting a gas stream containing hydrogen sulfide with a first absorbent solution to form sulfides in the first absorbent solution, controlling the pH of the first absorbent solution during the contacting step, oxidizing the first absorbent solution to convert at least some of the sulfides thereof to a thiosulfate and/or sulfate to thereby produce a second absorbent solution that contains the thiosulfate and/or sulfate and has a lower sulfide content than the first absorbent solution, and delivering a first portion of the second absorbent solution for use in the contacting step and discharging a second portion of the second absorbent solution from the system.

According to another aspect of the invention, such a process may include contacting a gas stream containing hydrogen sulfide with an ammoniated aqueous absorbent solution to form sulfides in the ammoniated aqueous absorbent solution, controlling the pH of the ammoniated aqueous absorbent solution during the contacting step by adding ammonia to the ammoniated aqueous absorbent solution, oxidizing the ammoniated aqueous absorbent solution to convert at least some of the sulfides thereof to ammonium thiosulfate and/or ammonium sulfate to thereby produce a second absorbent solution that contains the ammonium thiosulfate and/or ammonium sulfate and has a lower sulfide content than the ammoniated aqueous absorbent solution, and delivering a first portion of the second absorbent solution for use in the contacting step and discharging a second portion of the second absorbent solution from the system.

The invention also encompasses systems for performing the processes described above. Such a system includes an absorber vessel configured to receive the gas stream that contains hydrogen sulfide and receive a supply of the absorbent solution. The absorber vessel includes a gas-to-liquid mass transfer device that contacts the gas stream with the absorbent solution to absorb the hydrogen sulfide into the absorbent solution. Oxidation of the first absorbent solution may be performed in the absorber vessel or in a second vessel to form the second absorbent solution, which preferably contains highly-concentrated ammonium thiosulfate and/or ammonium sulfate.

Technical aspects of the systems and processes described above preferably include the ability to produce ammonium thiosulfate and/or ammonium sulfate as a useful fertilizer product.

Other systems, processes, features, and advantages of the present invention will become apparent to those with ordinary skill in the art upon examination of the following drawings and detailed description. It is intended that all such additional systems, processes, features, and advantages be included within this description, be within the scope of the present invention, and be protected by the accompanying claims.

BRIEF DESCRIPTION OF THE DRAWINGS

Aspects of the invention can be better understood with reference to the following drawings. The components in the drawings are not necessarily to scale, emphasis instead being placed upon clearly illustrating the principles of the present invention.

DETAILED DESCRIPTION OF THE INVENTION

Figure 1:
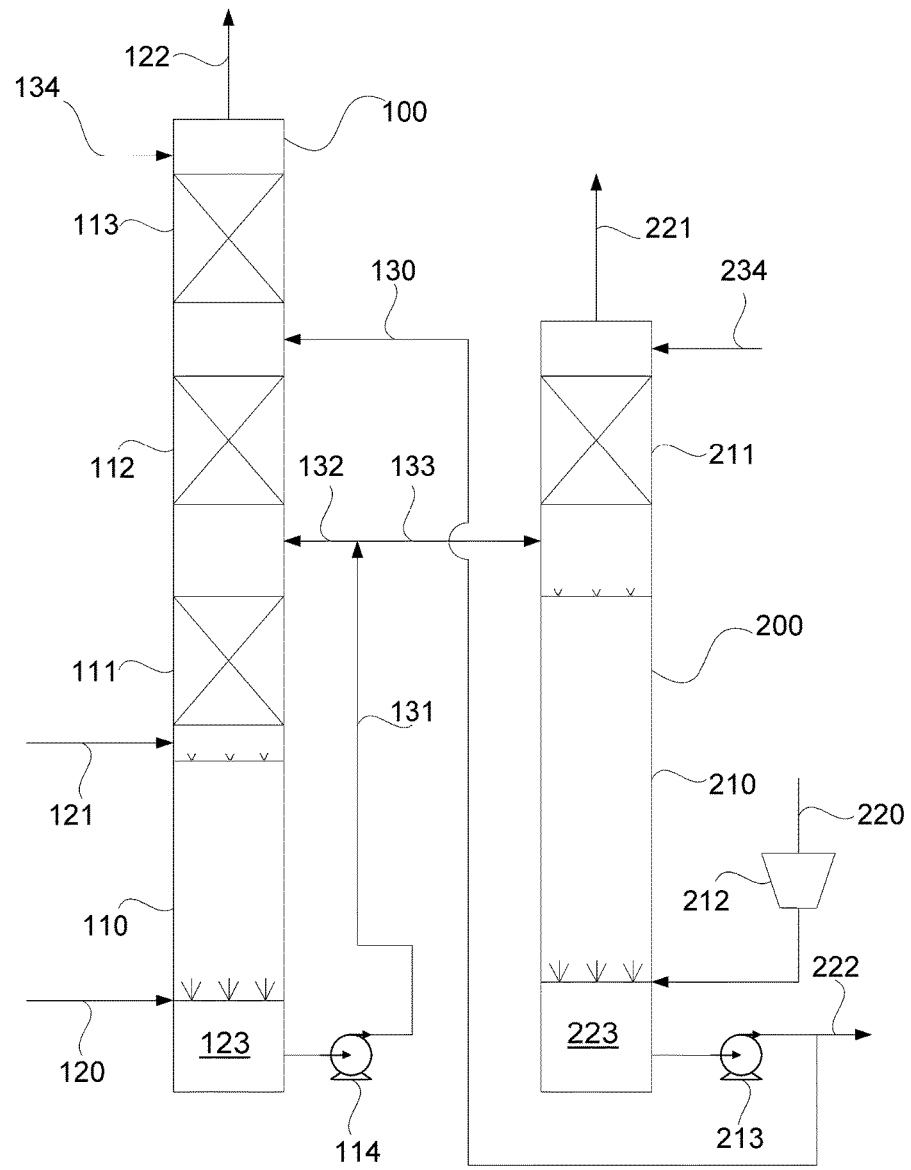
FIG. 1 is a diagram generally depicting certain details of a hydrogen sulfide absorption system adapted to capture hydrogen sulfide and a sulfide oxidation system adapted to convert captured hydrogen sulfide to thiosulfate and/or sulfate.

The present invention generally relates to systems and processes for removing hydrogen sulfide from gas streams, including but not limited to natural and associated gas, gas streams from biomass processing, coal and oil gasification processes, refinery streams, sour water stripper streams, etc., whereby hydrogen sulfide is captured, reacted, and oxidized to form thiosulfate and/or sulfate. The invention is preferably a high efficiency system capable of using an absorbent solution to capture hydrogen sulfide from gas streams. In particular embodiments, an ammoniated aqueous absorbent solution is used that contains free dissolved ammonia (anhydrous ammonia, $NH_3$) and ammonium thiosulfate (($NH_4$)$_2S_2O_3$) and/or ammonium sulfate (($NH_4$)$_2SO_4$), and reacts and oxidizes captured hydrogen sulfide in the absorbent solution to produce additional ammonium thiosulfate and/or ammonium sulfate. While the following discussion will be directed to the use of such an ammoniated aqueous absorbent solution, it should be understood by those of ordinary skill in the art that a chemically similar species could be substituted for the ammoniated aqueous absorbent solution, examples of which include sodium hydroxide, potassium hydroxide, sodium carbonate, sodium bicarbonate, potassium carbonate, and potassium bicarbonate.

The process of capturing hydrogen sulfide using an ammoniated aqueous absorbent solution (which may be performed in an absorber, for example) primarily produces ammonium bisulfide (($NH_4$)HS; ammonium hydrosulfide) and/or ammonium sulfide (($NH_4$)$_2$S) as follows:

  (1)

  (2)

In the typical case in which carbon dioxide is also captured and present in the absorbent solution, a portion of the carbon dioxide may be reacted to form ammonium bicarbonate (($NH_4$)HCO$_3$) as follows:

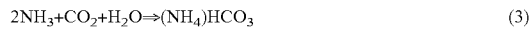  (3)

The pH of the absorbent solution is generally in a range of about 5 to about 10, and ammonium bisulfide of Equation (1) and ammonium bicarbonate of Equation (3) are typically the main products of the reactions. The process can be selective to capture hydrogen sulfide by operating the absorber in a pH range of about 5 to about 8. At the lower end of this pH range, only ammonium bisulfide of Equation (1) is ordinarily produced.

The conversion of the ammonium bisulfide and/or ammonium sulfide to ammonium thiosulfate and/or ammonium sulfate may be accomplished by bubbling an oxygen-containing gas (for example, air or oxygen-enriched air) through the absorbent solution, such that the following reactions are able to take place:

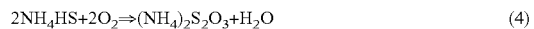  (4)

  (5)

  (6)

  (7)

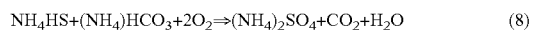  (8)

As shown in Equations (4) and (5), 2 moles of $O_2$ oxidize 2 moles of ammonium sulfide or 2 moles of ammonium bisulfide to form 1 mole of ammonium thiosulfate. As shown in Equations (6) and (7), 2 moles of $O_2$ oxidize 1 mole of ammonium sulfide or 1 mole of ammonium bisulfide to form 1 one mole of ammonium sulfate. Also, Equation (8) shows that the oxidation of ammonium bisulfide is accompanied by stripping of carbon dioxide from the absorbent solution. The relative amounts of ammonium sulfate and ammonium thiosulfate that form can be controlled such that, for example, ammonium thiosulfate can be predominantly produced. As a matter of convenience, unless indicated otherwise, the term "ammonium sulfide" or simply "sulfide" may be used herein to collectively refer to ammonium bisulfide and ammonium sulfide and the term "ammonium sulfate" or simply "sulfate" may be used herein to collectively refer to ammonium thiosulfate and ammonium sulfate.

FIG. 1 is a diagram generally depicting an embodiment of a system configured to capture hydrogen sulfide from a gas stream 121 and react and oxidize the captured hydrogen sulfide to produce ammonium thiosulfate and/or ammonium sulfate in accordance with the reactions described above. In FIG. 1, an absorber vessel 100 is configured to receive the gas stream 121 containing hydrogen sulfide. The absorber vessel 100 can be operated over a range of pressures, for example, from about 1 bar to about 100 bars. The gas stream 121 may be of a type produced by a variety of industrial facilities, or natural gas produced in a natural gas well, or a gas produced by any other process noted above. The absorber vessel 100 is also configured to receive ammonia in the form of an ammonia-containing stream 120 of an anhydrous or aqueous solution. The nonlimiting embodiment of the absorber vessel 100 represented in FIG. 1 comprises a tank 110 and multiple gas-to-liquid mass transfer devices of any suitable types, represented in FIG. 1 as comprising a first gas-liquid contact section 111 above the tank 110, a second gas-liquid contact section 112 above the first gas-liquid contact section 111, and an optional third gas-liquid contact section 113 above the first and second gas-liquid contact sections 111 and 112. The gas stream 121 is shown in FIG. 1 as introduced immediately above a volume of an ammoniated aqueous absorbent solution 123 contained in the tank 110, which also receives the ammonia-containing stream 120. A recycle stream 131 of the absorbent solution 123 is drawn from the tank 110 with a pump 114 or other suitable means. A portion 132 of the recycle stream 131 is delivered to a region of the absorber vessel 100 above the tank 110, for example, at or above the top of the first gas-liquid contact section 111.

The bulk of the hydrogen sulfide and a fraction of the carbon dioxide contained in the gas stream 121 are preferably captured by the recycled portion 132 of the absorbent solution within the first gas-liquid contact section 111. As a consequence of Equations (4) to (7) above, the absorbent solution 123 that falls from the contact section 111 and collects in the tank 110 contains ammonium bisulfide and/or ammonium sulfide, and therefore may be referred to herein as a sulfide-containing ammoniated aqueous absorbent solution 123, or more simply a sulfide-containing absorbent solution 123. Gas-liquid contact occurring within the first gas-liquid contact section 111 may be random or utilize structural packing, trays, or any other commonly used gas-liquid contacting system.

The second gas-liquid contact section 112 receives a stream 130 of a solution 223 from an oxidation vessel 200 to capture residual hydrogen sulfide and also capture ammonia that may be emitted from the absorbent solution within the first gas-liquid contact section 111. For reasons discussed below, the solution 223 contains ammonium thiosulfate and/or ammonium sulfate, but as a matter of convenience will be referred to herein simply as the second absorbent solution 223. The second absorbent solution 223 is used as an absorbing solution in the second gas-liquid contact section 112. The second absorbent solution 223 contains a lower concentration of hydrogen sulfide and has a lower pH than the absorbent solution 123 in the tank 110, and thus has a lower vapor pressure of both ammonia and hydrogen sulfide and a better absorption capacity for ammonia and hydrogen sulfide. The concentration of ammonium sulfides and/or ammonium bisulfides in the absorbent solution 123 can be maintained in a desired range, for example, about 100 to about 50,000 mg/liter, by adjusting the pH of the solution 123 and by adjusting the amount of the second absorbent solution 223 delivered to the absorber tower 100 via the stream 130. Gas-liquid contact occurring within the second gas-liquid contact section 112 may be random or utilize structural packing, trays, or any other commonly used contacting systems.

An optional wash water stream 134 may be introduced into the third gas-liquid contact section 113 to capture residual ammonia and hydrogen sulfide, preferably reducing their levels to extremely low concentrations so that a clean gas stream 122 emitted from the vessel 100 contains practically no ammonia or hydrogen sulfide. The amount of wash water in the stream 134 can be controlled to minimize emission while maintaining a relatively high concentration of ammonium sulfate within the absorbent solution 123 that collects in the tank 110, for example, in a range of about 10 to about 60% ammonium sulfate by weight. To achieve this aspect, low flowrate trays may be used in the third gas-liquid contact section 113, though the use of other gas-liquid contacting systems is also foreseeable.

In further reference to FIG. 1, the oxidation vessel 200 is configured to receive a bleed stream 133 of the absorbent solution drawn from the recycle stream 131. The oxidation vessel 200 includes a tank 210 configured to receive a stream 220 of air (or alternatively or in addition, another oxygen-containing gas or fluid, for example, oxygen, oxygen-enriched air, hydrogen peroxide, etc.), for example, delivered with a compressor 212. The tank 210 contains the second absorbent solution 223, which also contains ammonium sulfide and/or ammonium bisulfide as a consequence of receiving the bleed stream 133 of absorbent solution from the absorber vessel 100. The air stream 220 is brought into contact with the second absorbent solution 223 within the tank 210 to perform a low temperature oxidation step by which the ammonium sulfide and/or ammonium bisulfide are oxidized to form ammonium thiosulfate (Equations (4) and (5)) and/or ammonium sulfate (Equations (6) through (8)). A catalyst may be used to enhance the oxidation of the ammonium sulfide and/or ammonium bisulfide to ammonium thiosulfate and/or ammonium sulfate, for example, iron in the ferric or ferrous state.

The second absorbent solution 223 within the tank 210 is a product of the process represented in FIG. 1 and contains sulfur compounds as a result of capturing sulfides in the absorber vessel 100 and oxidizing the sulfides in the oxidation vessel 200. The air stream 220 introduced into the tank 210 also strips carbon dioxide from the second absorbent solution 223. The gas (e.g., air) rising from the solution 223 in the tank 210 will have a reduced level of oxygen (oxygen-deficient air) and contain carbon dioxide and low concentrations of ammonia. The oxygen-deficient air rises upwards through the vessel 200 to a gas-liquid contact section 211, where the oxygen-deficient air is contacted with a stream 234 of wash water to capture the ammonia from the oxygen-deficient air in such a way that an air stream 221 containing low concentrations of ammonia and carbon dioxide is discharged from the system. A pump 213 is represented as delivering a portion of the second absorbent solution 223 to the absorber vessel 100 via the stream 130. A bleed stream 222 of the second absorbent solution 223 can be drawn from the oxidation vessel 200 as a byproduct of the process, for example, as a highly concentrated fertilizer solution, or can be sent to a crystalizer (not shown) to produce ammonium sulfate crystals.

Figure 2:
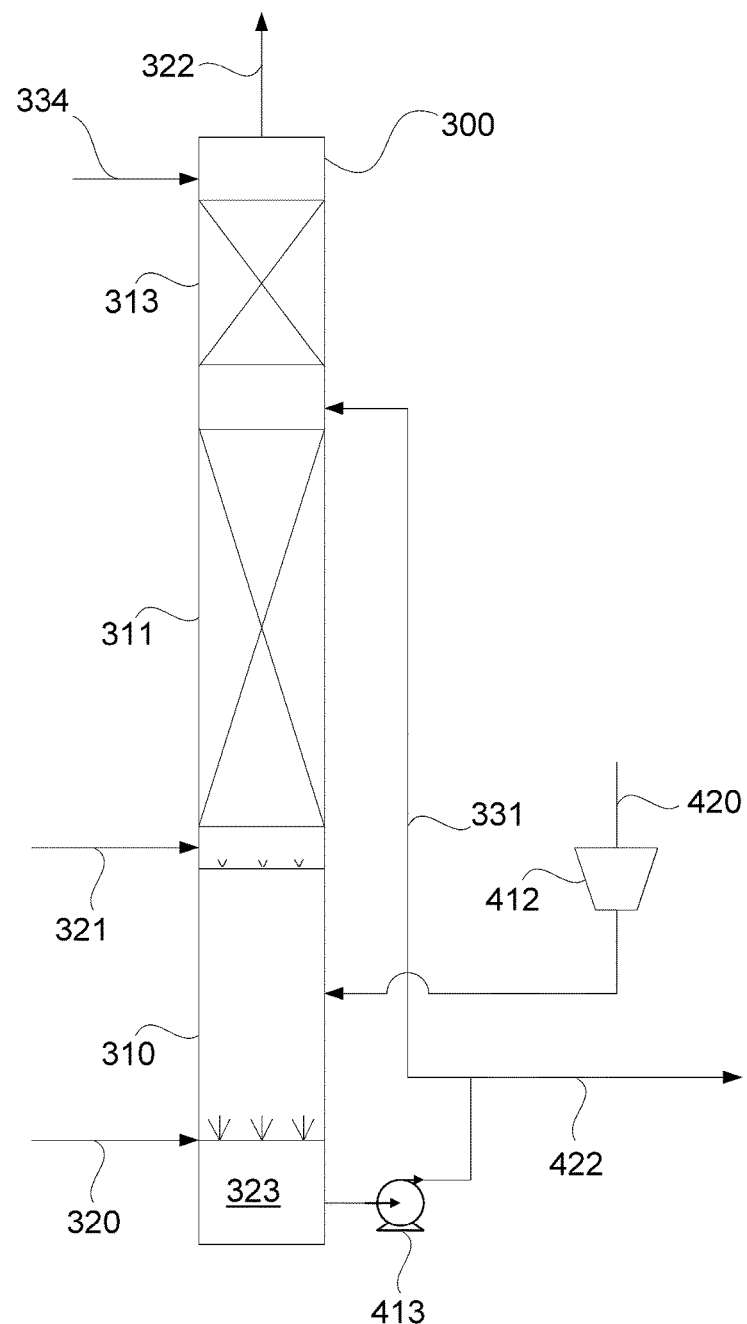
FIG. 2 is a diagram generally depicting certain details of a system adapted to capture hydrogen sulfide and convert the captured hydrogen sulfide to thiosulfate and/or sulfate.

FIG. 2 is a diagram generally depicting another embodiment of a system configured to capture hydrogen sulfide from a gas stream 321 and oxidize the captured hydrogen sulfide to produce ammonium thiosulfate and/or ammonium sulfate in accordance with the reactions described above. The system of FIG. 2 is particularly adapted to treat gas streams that contain non-combustible compounds, such as gas streams produced by sour water treatment facilities. In view of similarities between the embodiments of FIGS. 1 and 2, the following discussion of FIG. 2 will focus primarily on aspects of the second embodiment that differ from the first embodiment in some notable or significant manner. Other aspects of the second embodiment not discussed in any detail can be, in terms of structure, function, materials, etc., essentially as was described for the first embodiment.

The system represented in FIG. 2 combines the functions of hydrogen sulfide absorption and sulfide oxidation in a single vessel 300, instead of the separate absorber and oxidation vessels 100 and 200 of FIG. 1. The vessel 300 is configured to receive the gas stream 321 containing hydrogen sulfide immediately above a volume of an ammoniated aqueous absorbent solution 323 contained in a tank 310, which also receives a stream 320 of ammonia in the form of anhydrous or aqueous solution. A recycle stream 331 of the absorbent solution is drawn from the tank 310 with a pump 413 or other suitable means, and is delivered to a region of the vessel 300 above the tank 310, for example, at or above the top of a gas-liquid contact section 311, where the bulk of the hydrogen sulfide and a fraction of the carbon dioxide contained in the gas stream 321 are captured by the recycle stream 331 of the absorbent solution 323. The ammonia-containing stream 320 is introduced into the tank 300 to react with the captured hydrogen sulfide, and a stream 420 of air (or alternatively or in addition, another oxygen-containing gas or fluid, for example, oxygen, oxygen-enriched air, hydrogen peroxide, etc.) is introduced into the tank 310 with a compressor 412 to oxidize the ammonium sulfide and ammonium bisulfide to form ammonium thiosulfate (Equations (4) and (5)) and/or ammonium sulfate (Equations (6) through (8)), such that the absorbent solution 323 within the tank 310 is a product of the process represented in FIG. 2 and contains sulfur compounds that were captured and oxidized in the vessel 300. A portion of the resultant absorbent solution 323 drawn from the tank 310 with the pump 413 can be bled from the recycle stream 331 to yield an ammonium sulfate fertilizer stream 422 as a product of the process.

In further reference to FIG. 2, the air stream 420 introduced into the tank 300 rises through the solution 323 to combine with the hydrogen sulfide-containing gas stream 321 and further rises through the gas-liquid contact section 311, where the hydrogen sulfide from the gas stream 321 is captured in the recycle stream 331 delivered by the pump 413. The resulting gas (e.g., air) rising through the vessel 300 above the gas-liquid contact section 311 is lean in hydrogen sulfide and contains residual ammonia. A wash water stream 334 is shown in FIG. 2 as being introduced into a second gas-liquid contact section 313 to capture the residual ammonia and hydrogen sulfide, preferably reducing their levels to extremely low concentrations so that a clean gas stream 322 emitted from the vessel 300 contains very low concentrations of hydrogen sulfide and ammonia.

A nonlimiting embodiment of the invention will now be described in reference to an example intended to illustrate certain aspects of the systems and processes described above. Those skilled in the art will appreciate that systems and processes within the scope of the invention may operate under different conditions besides those described for the example. For convenience, the example is described in reference to FIG. 1.

A stream 121 of natural gas (NG) with a "Inlet" composition as identified in Table 1 (below) enters the absorber vessel 100 at a rate of 300,000 Nm³/day (about 11 million standard cubic feet per day (MMscfd) and at a pressure of 20 bar, flows upward through the gas-liquid contact sections 111, 112, and 113, and is discharged as a gas stream 122 from the vessel 100 with an "Outlet" composition identified in Table 1. Practically all the hydrogen sulfide from the natural gas stream 121 (0.2% mole concentration, or about 38 kg/hr) is captured with the absorbent solutions 123 and 223 that are introduced to the absorber vessel 100 via the streams 130 and 132 and flows downward through the gas-liquid contact sections 111 and 112. The recycle rate achieved with the absorbent solution 123 within the contact section 111 corresponds to a liquid/gas weight ratio of about 5 to about 10 kg/kg for a total flow of about 50,000 to about 100,000 kg/hr of ammonium sulfate solution. The pH is controlled in the range of 6.5-7.0 and achieved by adding anhydrous ammonia to the bottom of the tank 110 at a rate of about 38 kg/hr of ammonia via the stream 120.

The sulfide concentration in the absorber tank 100 is allowed to accumulate to below 2000 ppm by the introduction of about 20,000 kg/hr of ammonium sulfate solution delivered by the stream 130 from the oxidation vessel 200 to the gas-liquid contact section 112 and by withdrawing a similar amount of the absorbent solution via the stream 133 from the absorber vessel 100 to the oxidation vessel 200.

Within the contact section 112, the stream 130 of second absorbent solution captures residual hydrogen sulfide that was not captured in the lower contact section 111, and also captures a low concentration of ammonia that has evaporated from the first and second absorbent solutions 123 and 223. The final water wash of the gas rising from the contact section 112 is performed in the upper gas-liquid contact section 113, where about 300 kg/hr of water is introduced via the stream 134. The amount of water used for wash is controlled to produce a 20 to 60% weight ammonium sulfate and/or thiosulfate content in the absorbent solution 123 in the absorber vessel 100. The stream 133 of absorbent solution 123 is the feed solution to the oxidation vessel 200 and in the present example is preferably equal in volume per unit time of the sum of solutions flowing in the streams 130, 134, and 120 and the hydrogen sulfide and carbon dioxide captured from the NG stream 121.

The sulfide and/or bisulfide in the stream 133 is oxidized to sulfate and/or thiosulfate in the oxidation vessel 200. Table 2 provides information of the typical flow rate of air calculated to complete the oxidation of sulfide/bisulfide to sulfate/thiosulfate in the oxidation vessel 200. About 28,560 Nm³/day of air is delivered via the stream 220 to fully oxidize the 38 kg/hr (912 kg/day) sulfide captured in the absorption process performed in the absorber vessel 100. The gas stream 221 discharged from the oxidation vessel 200 preferably does not contain any measurable hydrogen sulfide or ammonia, the residual of which is washed in the gas-liquid contact section 211 of the oxidation vessel 200 by the wash water stream 234 at a rate of about 100 kg/hr. Carbon dioxide that was captured in the ammonium sulfate solution to produce ammonium bicarbonate is stripped from the solution by the oxygen-containing gas (e.g., air) rising through the vessel 200 and exits the vessel 200 via the stream 221. The bleed stream 222 exiting the tank 210 is a fully-oxidized ammonium sulfate solution that can be used as a fertilizer solution or sent to a crystalizer to produce solid ammonium sulfate fertilizer. In the present example, the stream 222 contains about 148 kg/hr of ammonium sulfate and about 400 kg/hr of water, yielding a 27% weight ammonium sulfate solution. The process consumes about 38 kg/hr of anhydrous ammonia delivered to the absorber vessel 100 via the stream 120.

TABLE 1

Absorber inlet and outlet gas streams

|  | Inlet | Outlet |
|---|---|---|
| Flow rate, Nm³/day | 300,000 | 298,800 |
| Flow rate, Kg/day | 228,630 | 226,560 |
| Pressure, Bar | 20.0 | 19.5 |
| Temperature, C. | 30.0 | 30.0 |
| Composition, % mole |  |  |
| $CH_4$ | 94.10 | 94.48 |
| $C_2H_6$ | 4.00 | 4.02 |
| $C_3H_8$ | 1.00 | 1.00 |
| $CO_2$ | 0.70 | 0.50 |
| $H_2S$ | 0.20 | 0.00 |
| Total | 100.00 | 100.00 |

TABLE 2

Oxidizer inlet and outlet gas streams

|  | Inlet | Outlet |
|---|---|---|
| Flow rate, Nm³/day | 28,560 | 27,660 |
| Flow rate, Kg/day | 37,414 | 35,849 |
| Pressure, Bar | 10.0 | 9.7 |
| Temperature, C. | 30.0 | 30.0 |

TABLE 2-continued

Oxidizer inlet and outlet gas streams

|  | Inlet | Outlet |
|---|---|---|
| Composition, % mole | | |
| $N_2$ | 78.96 | 81.60 |
| $O_2$ | 21.00 | 16.30 |
| $CO_2$ | 0.04 | 2.10 |
| $H_2S$ | 0.00 | 0.00 |
| Total | 100.00 | 100.00 |

While the invention has been described in terms of particular embodiments and examples, it should be apparent that alternatives could be adopted by one skilled in the art. For example, the systems and components schematically represented in the drawings could widely vary in appearance and construction, functions of certain components of the systems could be performed by components of different construction but capable of a similar (though not necessarily equivalent) function, process parameters could be modified, and various materials could be used in the fabrication of the systems. In addition, the invention encompasses additional or alternative embodiments in which one or more features or aspects of the different disclosed embodiments may be combined. Accordingly, it should be understood that the invention is not necessarily limited to any embodiment described herein or represented in the drawings. It should also be understood that the phraseology and terminology employed above are for the purpose of describing the illustrated embodiments, and do not necessarily serve as limitations to the scope of the invention. Therefore, the scope of the invention is to be limited only by the following claims.

The invention claimed is:

1. A process of capturing hydrogen sulfide from a gas stream and oxidizing captured hydrogen sulfide to form a thiosulfate, a sulfate, or a combination thereof, the process comprising:
   obtaining a gas stream containing hydrogen sulfide, the gas stream being natural gas, refinery process gas, or syngas from gasification;
   contacting the gas stream with a first absorbent solution to form sulfides in the first absorbent solution, wherein the first absorbent solution is an ammoniated aqueous absorbent solution containing ammonia and ammonium thiosulfate and/or ammonium sulfate and the ammonia reacts with the hydrogen sulfide to form the sulfides;
   controlling pH of the first absorbent solution during the contacting step;
   oxidizing the first absorbent solution to convert at least some of the sulfides thereof to form an additional amount of ammonium thiosulfate and/or ammonium sulfate, thereby producing a second absorbent solution that contains the additional amount of ammonium thiosulfate and/or ammonium sulfate and has a lower sulfide content than the first absorbent solution; and
   delivering a first portion of the second absorbent solution for use in the contacting step to capture residual hydrogen sulfide in the gas stream and capture ammonia emitted from the first absorbent solution; and
   discharging a second portion of the second absorbent solution from the system.

2. The process of claim 1, wherein the first absorbent solution consists essentially of the ammonia, the sulfides, the ammonium thiosulfate and/or ammonium sulfate, and water.

3. The process of claim 2, wherein the sulfides comprise ammonium bisulfide and ammonium sulfide.

4. The process of claim 1, wherein the first absorbent solution consists of the ammonia, the sulfides, the ammonium thiosulfate and/or ammonium sulfate, and water.

5. The process of claim 4, wherein the sulfides comprise ammonium bisulfide and ammonium sulfide.

6. The process of claim 1, wherein the ammoniated aqueous absorbent solution contains ammonium thiosulfate and the oxidizing of the ammoniated aqueous absorbent solution converts at least some of the sulfides thereof to additional ammonium thiosulfate.

7. The process of claim 1, wherein the pH of the ammoniated aqueous absorbent solution is controlled during the contacting step by adding ammonia to the ammoniated aqueous absorbent solution.

8. The process of claim 1, wherein the contacting step is performed at an elevated pressure.

9. The process of claim 8, wherein the oxidizing step is performed at a second elevated pressure that is less than the elevated pressure of the contacting step.

10. A process of capturing hydrogen sulfide from a gas stream and oxidizing captured hydrogen sulfide to form a thiosulfate, a sulfate, or a combination thereof, the process comprising:
    obtaining a gas stream containing hydrogen sulfide, the gas stream being natural gas, refinery process gas, or syngas from gasification;
    contacting the gas stream with an ammoniated aqueous absorbent solution containing ammonia and ammonium thiosulfate and/or ammonium sulfate, the ammonia reacting with the hydrogen sulfide to form sulfides in the ammoniated aqueous absorbent solution;
    controlling pH of the ammoniated aqueous absorbent solution during the contacting step by adding ammonia to the ammoniated aqueous absorbent solution;
    oxidizing the ammoniated aqueous absorbent solution to convert at least some of the sulfides thereof to form an additional amount of ammonium thiosulfate and/or ammonium sulfate, thereby producing a second absorbent solution that contains the additional amount of ammonium thiosulfate and/or ammonium sulfate and has a lower sulfide content than the ammoniated aqueous absorbent solution; and
    delivering a first portion of the second absorbent solution for use in the contacting step to capture residual hydrogen sulfide in the gas stream and capture ammonia emitted from the first absorbent solution; and
    discharging a second portion of the second absorbent solution from the system.

11. The process of claim 10, wherein the ammoniated aqueous absorbent solution contains ammonium thiosulfate and the oxidizing of the ammoniated aqueous absorbent solution converts at least some of the sulfides thereof to additional ammonium thiosulfate.

12. The process of claim 10, wherein the pH of the ammoniated aqueous absorbent solution is about 5 to about 10.

13. The process of claim 10, further comprising using water to wash the gas stream following the contacting step to reduce ammonia concentration therein.

14. The process of claim 10, wherein the sulfides in the ammoniated aqueous absorbent solution are maintained at a concentration of about 100 to about 50,000 mg/liter by adjusting the concentration of the ammonium sulfate solution used in the contacting step.

15. The process of claim 10, wherein the contacting step is performed at a pressure of about 1 to about 100 bar.

16. The process of claim 10, further comprising using a catalyst to enhance the oxidation of the sulfides to the ammonium thiosulfate and/or the ammonium sulfate during the oxidation step.

17. The process of claim 16, wherein the catalyst is iron in ferric or ferrous state.

18. The process of claim 10, wherein the oxidizing step is performed with an oxygen-containing gas chosen from the group consisting of air, oxygen, oxygen-enriched air, hydrogen peroxide, or combinations thereof.

19. The process of claim 18, further comprising using water to wash the oxygen-containing gas following the oxidation step to reduce ammonia concentration therein.

* * * * *